Dec. 26, 1950   J. B. PHILLIPS   2,535,812
CLUTCH FOR TRACTOR MOUNTED HAYRAKES
Filed Aug. 14, 1948   3 Sheets-Sheet 1

JESSE B. PHILLIPS
INVENTOR

BY Herbert J. Brown
ATTORNEY

Dec. 26, 1950   J. B. PHILLIPS   2,535,812
CLUTCH FOR TRACTOR MOUNTED HAYRAKES
Filed Aug. 14, 1948   3 Sheets-Sheet 2
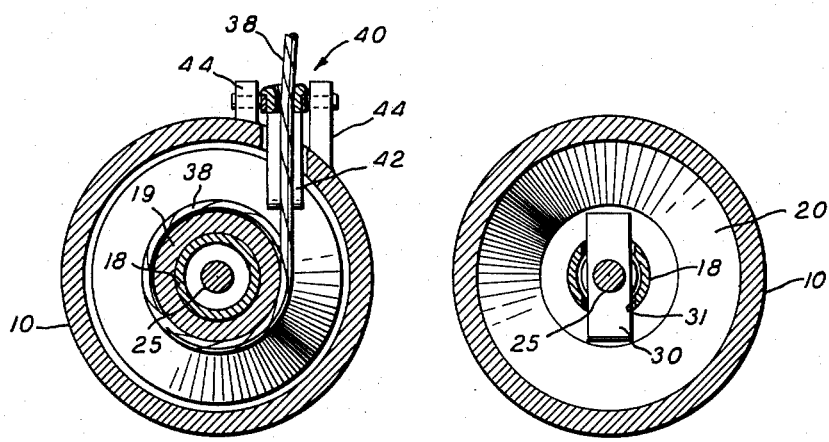
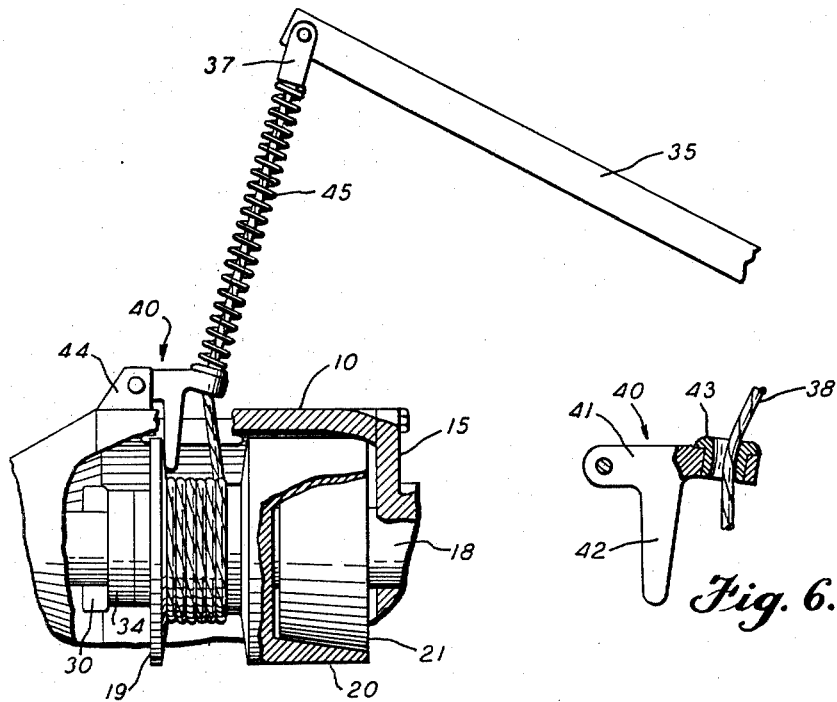
JESSE B. PHILLIPS
INVENTOR
BY
ATTORNEY Patented Dec. 26, 1950

2,535,812

UNITED STATES PATENT OFFICE 2,535,812

CLUTCH FOR TRACTOR MOUNTED HAYRAKES

Jesse B. Phillips, Fort Worth, Tex.

Application August 14, 1948, Serial No. 44,292

2 Claims. (Cl. 56—27)

This invention relates to tractor drawn hay rakes, and has for its primary object the provision of an efficient and inexpensive clutch for operating the rake by means of the tractor power takeoff.

Another object of the invention is to provide a construction and means whereby the rake may be quicky lifted and lowered for arranging windrows and for bunching hay.

A particular object of the invention is to provide an improved clutch construction capable of economical manufacture.

A further object of the invention is to provide an automatic release for a clutch mounted on the tractor and connected with a hay rake whereby the clutch is automatically disengaged when the rake is raised higher than necessary, and whereby the rake is returned to its raking position.

These and other objects of the invention will become apparent from the following description of the accompanying drawings, wherein:

Figure 3 is a transverse sectional view taken on lines 3—3 of Figure 2.

Figure 4 is a transverse sectional view taken on lines 4—4 of Figure 2.

Figure 5 is a broken sectional and elevational view of the clutch assembly and particularly showing the relation between the reel, the lifting arm, and the throwout mechanism of the automatic release.

Figure 6 is an elevational and broken sectional view of the throwout mechanism, and illustrating the lifting cable positioned therethrough.

Figure 1:
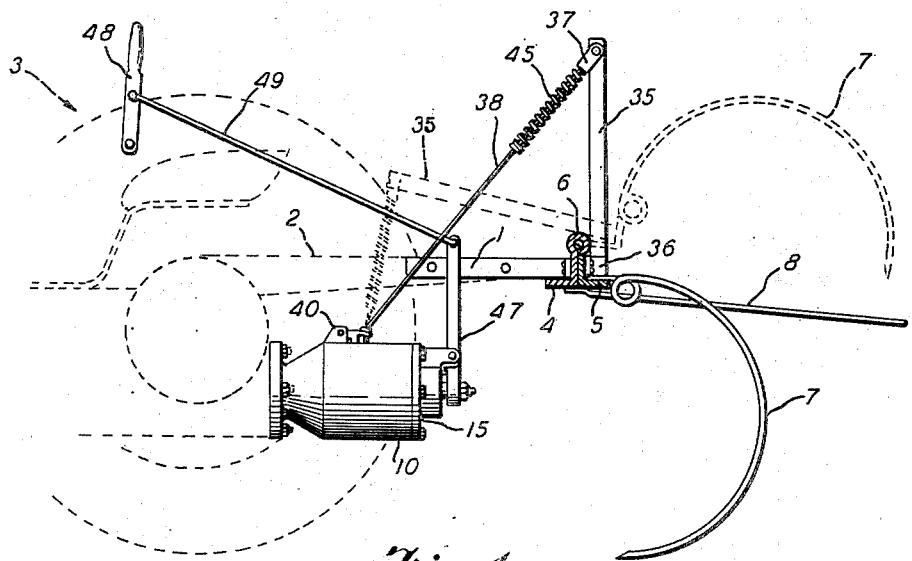
Figure 1 is a side elevational view of a clutch assembly embodying the features of the present invention, and showing the same attached to a hay rake, shown in partial section. The hay rake and clutch are mounted on a tractor, shown by means of dotted lines.
Figure 2:
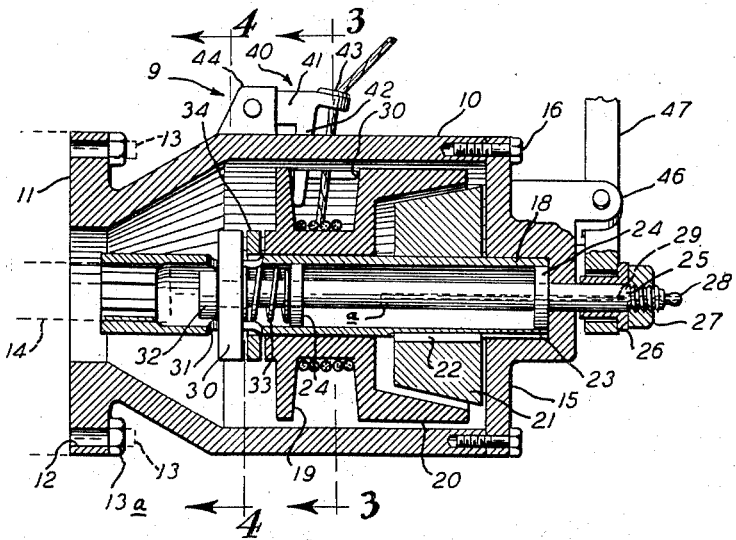
Figure 2 is a vertical longitudinal section of the clutch assembly shown in Figure 1.
Figure 7:
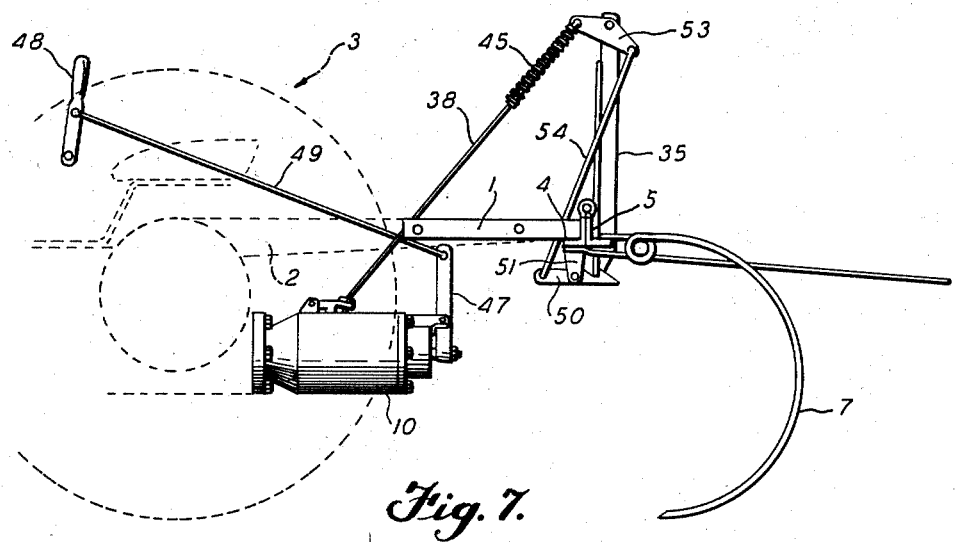
Figure 7 is a side elevational view of the clutch and rake, and additionally showing a latch arrangement for holding the teeth of the rake in their lowered position during the raking operation.
Figure 8:
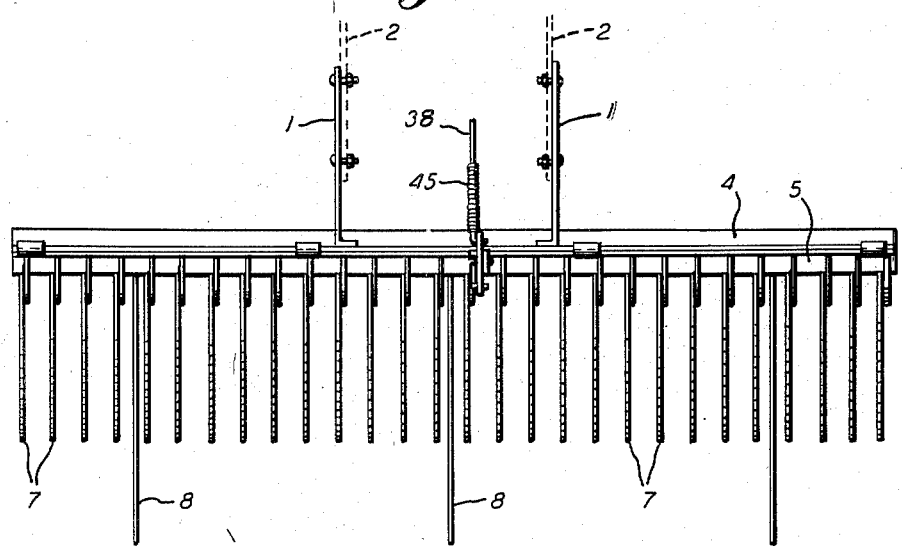
Figure 8 is a plan view of the rake illustrated in Figure 7.

The form of the invention shown includes a pair of side members 1 attached to the draw bars 2 of a tractor 3, and an angle iron 4 is attached across the ends of the side members 1 to provide a stationary frame member. One of the sides of the frame member 4 is vertically disposed and the other side of said member is horizontally disposed and directed beneath the side member 1. A tool bar 5 of angle iron is positioned in back to back relation relative to the vertical portion of the angular frame members 4 and is so arranged to dispose the lower horizontal sides of the member 4 and the bar 5 in a horizontal plane, as shown in Figures 1 and 7. The upper edges of the frame member 4 and tool bar 5 are formed to provide hinges 6 whereby the spaced teeth 7 attached to the said tool bar may be raised by means hereinafter described. Horizontal stripper bars 8 are secured to the lower surface of the frame member 4 and extend rearwardly between the teeth 7.

The clutch assembly 9, illustrated in detail in Figures 2 through 5, includes a cylindrical housing 10 having a tapered forward end and a flange 11 therearound. Holes 12 are formed through the flange 11 to receive the stud bolts 13 around the power takeoff 14. Nuts 13a on the studs 13 secure the housing 10 in place. The end of the housing 10, opposite the flange 11, is covered by means of a cap 15 held in place by bolts 16 threaded into the housing body, and which cap has a rearwardly projecting centrally located boss 17 which provides a bearing for one end of a tubular shaft 18 splined at its other end for engagement on the power takeoff 14.

A combination reel 19 and cup 20 are mounted for free rotation on the tubular shaft 18, and which cup is rearwardly directed for coaction with a clutch cone 21 secured on the said tubular shaft by means of a key 22 engaged in a keyway 23 in the said shaft. Annular spacers 24 are pressed into the tubular shaft 18 where they slidably support and align an actuating rod 25 extending outwardly through the boss 17 of the cap 15. The outer end of the rod 25 is provided with a flanged collar 26 which is retained in place by a nut 27. The outer central end of the rod 25 receives a grease cup 28 for communicating with a central opening 29 communicating with the interior of the tubular shaft 18 by means of a lateral outlet $a$ between the spacers 24.

The inner end of the rod 25 has a pressure finger 30 mounted for rotation thereon, and which finger extends outwardly in opposite directions from its center through openings 31 in the tubular shaft 18. The finger 30 is retained on the rod 25 by means of a shoulder 32 at its innermost end. A compression spring 33 is mounted on the rod 25 between the finger 30 and the innermost spacer 24, and a friction washer 34 is loosely positioned around the tubular shaft 18 and between the finger 30 and the inner end of the reel 19.

The described clutch assembly is for raising the teeth 7 of the rake assembly, and although the invention is capable of various means for connecting the said clutch with the said rake, the illustrated form of the invention provides a vertical lift arm 35 secured to the tool bar 5 by means of an angle bracket 36. A clevis 37 is pivotally mounted on the upper end of the lift arm 35, and, in turn, is connected with one end of a cable 38. The other end of the cable 38 is wound on the reel 19 after passing through an opening 39 in the clutch housing 10. A safety throwout 40, comprising a body 41, a finger 42 depending through the housing opening 39 and slidably contacting the inner flange of the reel 19, and a rearwardly projecting eye 43, is pivoted opposite the said eye on ears 44 integral with the clutch housing 10. A compression spring 45 is mounted around the cable 38 and is attached at one end to the clevis 37. The spring 45 is of such a length that it will contact the projecting eye 43 of the throwout 40 and cause the throwout finger 42 to bear against the inner flange of the reel 19, and disengage the cup 20 from the cone 21.

A pair of ears 46 integral with the face of the cap 15 and positioned near the edge thereof pivotally support a lever 47, the inner end of which is engaged with the flanged collar 26. It will be noted in Figure 2 that the arrangement of the flanged collar 26, lever 47, and nut 27 retaining the said collar, are arranged for moving the rod 25 outwardly. The last described operation moves the shaft finger 30 inwardly against the friction ring 34, which, in turn, moves the reel 19 and cup 20, whereby the latter engages the cone 21 mounted on the tubular shaft 18.

The lever 47 is actuated by another lever 48 pivotally mounted on the tractor 3 and provided with a linking rod 49 therebetween.

Figure 9:
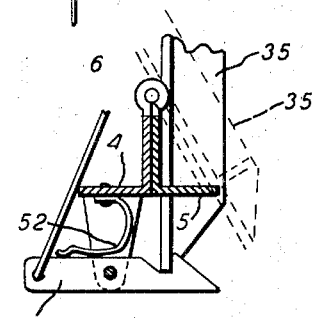
Figure 9 is an enlarged elevational and sectional view of the latch illustrated in Figure 7 and showing its associated parts in latched position. The disengaged position of the latched part is illustrated by means of dotted lines.

The described rake assembly may be provided with a latch 50 pivotally mounted on a bracket 51 depending from the frame member 4. The latch 50 is adapted to engage the lower end of the lifting arm 35. As shown in Figure 9, a spring 52 is mounted on the frame member 4 and adapted to press the extending end of the latch 50 downwardly so as to normally urge the connecting end of the said latch upwardly to engage the lower end of the lifting arm 35. A bell crank 53 is pivotally mounted on the upper end of the lift arm 35 and one end of which is connected with the extending end of the latch 50 by means of a connecting rod 54, whereas the other end of the bell crank is attached to the outer end of the cable 38 where the previously described compression spring 45 is attached.

In operation, the tractor 3 is driven forwardly with the rake teeth 7 in their down position for raking hay. To empty the rake, the hand lever 48 is actuated by the tractor operator, causing the connecting lever 47 to move a clutch rod 25 outwardly and thereby move the finger 30 and the friction ring 34 against the reel 19. The last referred to operation engages the cup 20 with the driven cone 21, causing the reel 19 to wind, and by reason of the connection of the cable 38 with the lifting arm 35, the rake teeth 7 are raised, as shown by dotted lines in Figure 1, to empty the hay therefrom. At this time the operator may disengage the cup 20 from the cone 21 by moving the hand lever 48 in the opposite direction from the direction for engaging the clutch, and thereby release the latter to let the teeth 7 fall and resume their raking position. However, if the operator does not operate the lever 48 in time to prevent the teeth 7 from rising above a determined level, the action of the compression spring 45 mounted on the cable 38 will contact the eye 43 of the throwout 40. By reason of the throwout finger positioned against the inner portion of the reel 19, the cup 20 is disengaged from the cone 21, thereby releasing the said reel and allowing the rake teeth 7 to fall.

The latch arrangement illustrated in Figures 7 and 9, by reason of its connection with the cable 38 through the bell crank 53 and connecting rod 54, releases the latch 50 from the lower end of the lifting arm 35 when the cable 38 is wound on the reel 19. Otherwise, the latch 50 maintains the teeth 7 in their lowered or raking position. When the teeth 7 are allowed to fall, the latch 50, by reason of its described shape and location, will again engage the lower end of the lifting arm 35.

The described form of the invention is not restrictive, but may be made in many ways within the scope of the appended claims.

What is claimed is:

1. A clutch for raising a hay rake pivotally mounted on a tractor having a power takeoff, the combination of a housing mounted over said power takeoff, a tubular shaft connected with said power takeoff and rotatably mounted within said housing, a cone secured on said tubular shaft, a cup and reel mounted for free rotation on said tubular shaft and adapted to engage said cone, a rod slidably positioned within the said tubular shaft and extending beyond the end of the said housing opposite the said power takeoff, a finger carried by said rod and adapted to frictionally engage the end of the said reel for engaging said cup with said cone, and a cable wound on said reel and adapted to engage said rake for raising the latter.

2. Apparatus for raising a hay rake mounted on a tractor, the combination of a housing mounted over the power takeoff of said tractor, a clutch assembly within said housing comprising a tubular shaft connected with said power takeoff, a combined reel and cup mounted for free rotation on said tubular shaft, an actuating rod slidably mounted within said tubular shaft, a cone rigidly secured on said tubular shaft and arranged to be engaged by said cup, means connecting said slidable rod with said cup for moving the latter along the said tubular shaft and engaging said cone, a cable wound on said reel, an opening in the side of said housing above said reel through which said cable passes, a finger pivotally mounted in said opening and extending inwardly of said housing and positioned to engage said reel, an eyelet in said finger through which said cable passes, and means carried by said cable and arranged for engaging said eyelet and thereby moving said finger to disengage said reel from said cone.

JESSE B. PHILLIPS.

REFERENCES CITED

The following references are of record in the file of this patent:

UNITED STATES PATENTS

| Number | Name | Date |
| --- | --- | --- |
| 922,323 | O'Thayne | May 18, 1909 |
| 1,738,924 | Przybyszewski | Dec. 10, 1929 |
| 2,127,405 | Hall | Aug. 16, 1938 |
| 2,271,591 | Hickman | Feb. 3, 1942 |
| 2,367,932 | Dunn | Jan. 23, 1945 |